(12) United States Patent  
Sasaki

(10) Patent No.: US 8,379,330 B2  
(45) Date of Patent: Feb. 19, 2013

(54) LENS FRAME RADIALLY-DISPLACING MECHANISM OF RETRACTABLE PHOTOGRAPHIC LENS

(75) Inventor: Takamitsu Sasaki, Saitama (JP)

(73) Assignee: Hoya Corporation, Tokyo (JP)

(*) Notice: Subject to any disclaimer, the term of this patent is extended or adjusted under 35 U.S.C. 154(b) by 275 days.

(21) Appl. No.: 12/767,143

(22) Filed: Apr. 26, 2010

(65) Prior Publication Data

US 2010/0277818 A1     Nov. 4, 2010

(30) Foreign Application Priority Data

May 1, 2009   (JP) ................................. 2009-112041

(51) Int. Cl.  
*G02B 7/02*   (2006.01)

(52) U.S. Cl. ...................................... 359/817

(58) Field of Classification Search .................. 359/817, 359/676, 684, 686, 688; 396/349  
See application file for complete search history.

(56) References Cited

U.S. PATENT DOCUMENTS

| | | | |
|---|---|---|---|
| 6,049,432 A * | 4/2000 | Machida et al. | ............. 396/349 |
| 6,952,526 B2 | 10/2005 | Nomura | |
| 7,085,486 B2 | 8/2006 | Nomura | |
| 2004/0141736 A1 | 7/2004 | Nomura | |
| 2006/0115262 A1 | 6/2006 | Nomura | |
| 2006/0193625 A1 | 8/2006 | Nomura | |
| 2006/0274430 A1 | 12/2006 | Nomura et al. | |
| 2007/0019938 A1 | 1/2007 | Nomura | |

FOREIGN PATENT DOCUMENTS

| | | |
|---|---|---|
| JP | 2004-151710 | 5/2004 |
| JP | 2004-258639 | 9/2004 |
| JP | 2008-170650 | 7/2008 |
| JP | 2009-025557 | 2/2009 |
| JP | 2010-26164 | 2/2010 |

* cited by examiner

*Primary Examiner* — Aliciai M Harrington  
(74) *Attorney, Agent, or Firm* — Greenblum & Bernstein, P.L.C.

(57) ABSTRACT

A lens frame radially-displacing mechanism of a retractable photographic lens, includes a photographing optical system; a linearly advancing/retreating ring guided linearly in an optical axis direction; a radially-displaceable support frame pivoted parallel to the optical axis, supports a radially-displaceable optical element and rotates between an on-axis position and an off-axis displaced position when the retractable photographic lens moves between the ready-to-photograph state and the retracted state; a rear support frame supporting a rear optical element; and a distance controller which controls approaching positions of the displaceable support frame and the rear support frame. The distance controller includes an approaching-position limiter which limits movements of the displaceable support frame and the rear support frame to a predetermined distance when the displaceable support frame moves rearward, and a distance extender which extends the predetermined distance when the displaceable support frame rotates toward the off-axis displaced position.

13 Claims, 10 Drawing Sheets

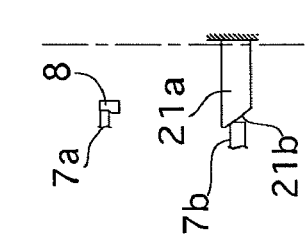
Fig. 9B(4)
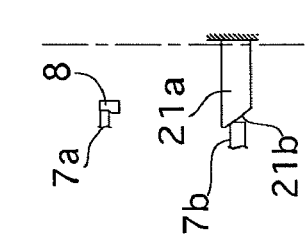
Fig. 9B(3)
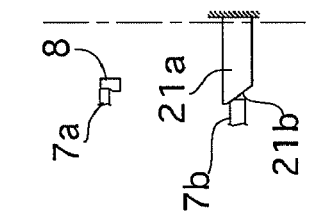
Fig. 9B(2)
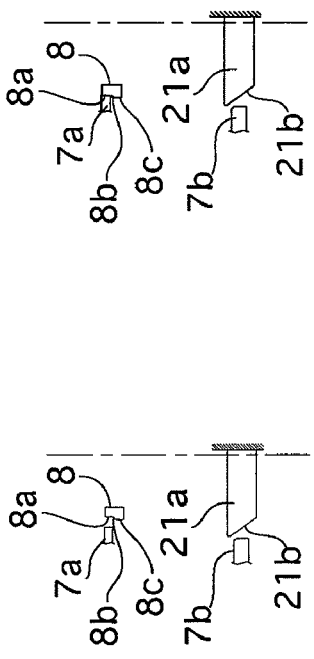
Fig. 9B(1)
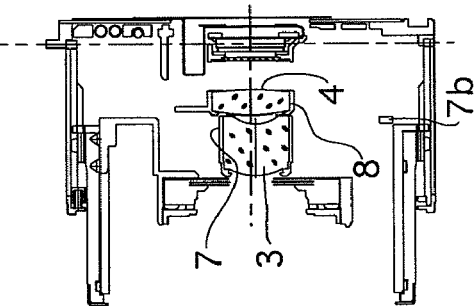
Fig. 9A(4)
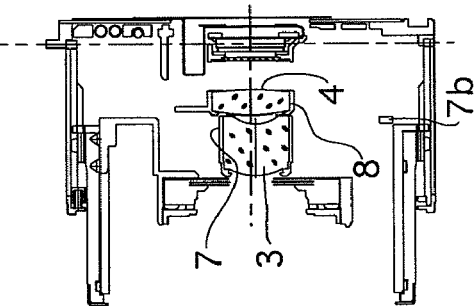
Fig. 9A(3)
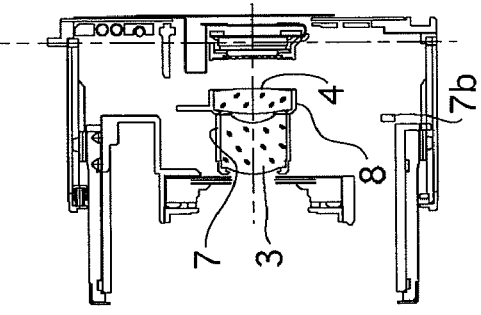
Fig. 9A(2)
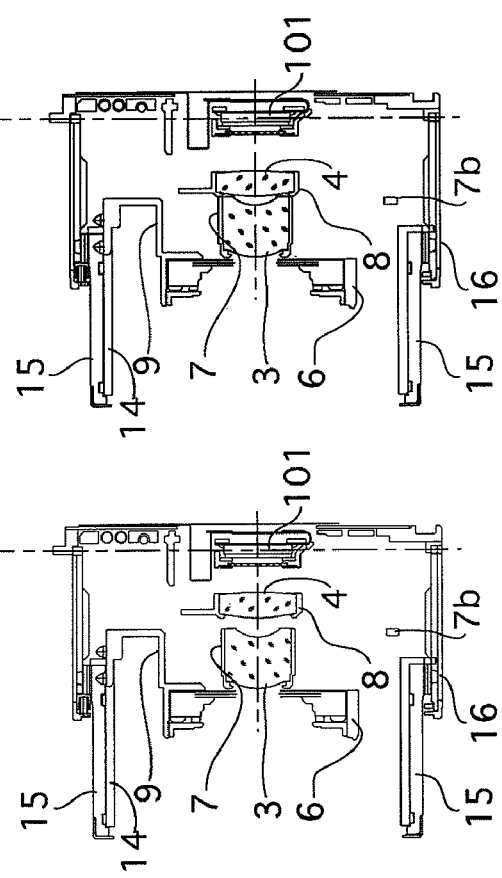
Fig. 9A(1)

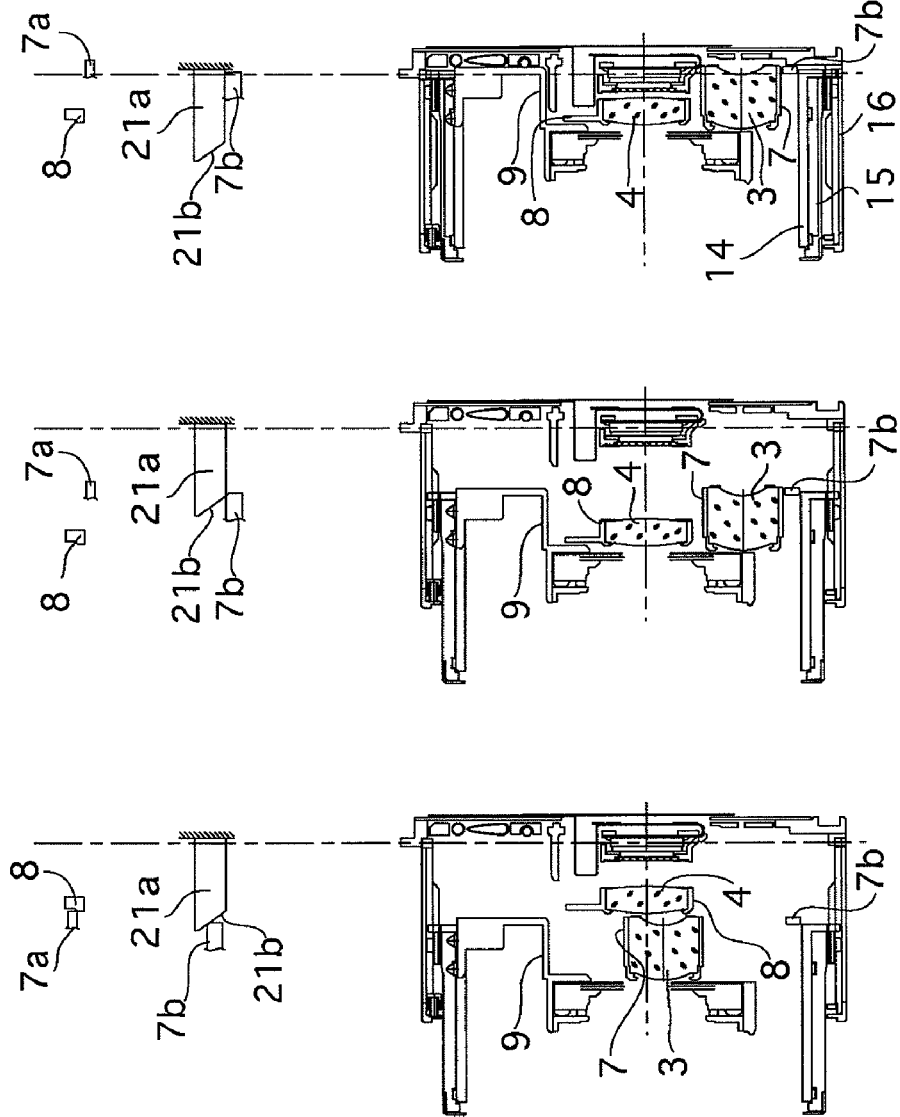

LENS FRAME RADIALLY-DISPLACING MECHANISM OF RETRACTABLE PHOTOGRAPHIC LENS

BACKGROUND OF THE INVENTION

1. Field of the Invention

The present invention relates to a lens frame radially-displacing mechanism, and in particular, relates to a radially-displacing mechanism for displacing a lens frame provided in a retractable photographic lens (barrel), wherein the lens frame is displaced to a position eccentric from a photographing optical axis when the retractable photographic lens is fully retracted.

2. Description of the Related Art

Various kinds of retractable photographic lenses (photographic lens barrels) in which a part of a photographing optical system is displaced to a position eccentric from a photographing optical axis of the photographing optical system when the retractable photographic lens is fully retracted have been developed. For instance, the assignee of the present invention has proposed a structure of a retractable photographic lens which rotates a radially-displaceable lens group (and the lens frame thereof) while preventing the radially-displaceable lens group (and the lens frame thereof) from interfering with other lens groups or lens frames during the retracting operation of the retractable photographic lens when it is fully retracted. This structure is disclosed in Japanese Unexamined Patent Publication 2004-151710.

However, the retractable photographic lens of the related art is structured so that a radially-displaceable lens group and a rear lens group positioned behind the radially-displaceable lens group do not approach closer to each other than a predetermined distance to be prevented from interfering with other members when the photographic lens is fully retracted, and accordingly, the distance between the radially-displaceable lens group and the rear lens group is set to a large distance.

SUMMARY OF THE INVENTION

The present invention provides a radially-displacing mechanism for displacing a lens frame contained in a retractable photographic lens, wherein the radially-displacing mechanism enables a radially-displaceable lens group and an adjacent lens group to approach each other by a maximum amount (limit) when the photographic lens is fully retracted.

According to an aspect of the present invention, a lens frame radially-displacing mechanism of a retractable photographic lens is provided, including a plurality of optical elements which constitute a photographing optical system; a linearly advancing/retreating ring which is guided linearly in an optical axis direction of the photographing optical system and retreats in a direction toward an imaging plane when the retractable photographic lens moves from a ready-to-photograph state to a retracted state; a radially-displaceable support frame which is pivoted about a pivot extending parallel to the optical axis, supports a radially-displaceable optical element included in the plurality of optical elements, and rotates about the pivot between an on-axis position, at which the radially-displaceable optical element is positioned on the optical axis, and an off-axis displaced position, at which the radially-displaceable optical element is eccentrically positioned with respect to the optical axis, when the retractable photographic lens moves between the ready-to-photograph state and the retracted state, respectively; a rear support frame which supports a rear optical element positioned behind the radially-displaceable optical element when the retractable photographic lens is in the ready-to-photograph state; and a distance controller which controls approaching positions of the displaceable support frame and the rear support frame. The distance controller includes an approaching-position limiter which limits relative movements of the displaceable support frame and the rear support frame to a predetermined distance between the approaching positions of the displaceable support frame and the rear support frame when the displaceable support frame moves rearward, and a distance extender which extends the predetermined distance between the approaching positions of the displaceable support frame and the rear support frame to an extended distance when the displaceable support frame rotates toward the off-axis displaced position.

It is desirable for the approaching-movement limiter to include a displaceable support-frame distance control member provided on the displaceable support frame, and a rear support-frame distance limiter provided on the rear support frame, the displaceable support-frame distance control member coming in contact with the rear support-frame distance limiter when the displaceable support frame and the rear support frame closely approach each other. The distance extender is formed as a rear support frame distance extending portion which is continuous with the rear support-frame distance limiter and with which the displaceable support-frame distance control member comes in sliding contact.

It is desirable for the rear support frame to include a rear support-frame distance holder which is continuous with the rear support frame distance extending portion, wherein the rear support-frame distance holder continues to hold the displaceable support frame and the rear support frame at the extended distance until the displaceable support frame reaches a radially-displaced position at which the displaceable support frame and the displaceable optical element do not interfere with the rear support frame and the rear optical element. Upon the displaceable support frame reaching the radially-displaced position, the displaceable support-frame distance control member is disengaged from the rear support-frame distance limiter.

It is desirable for the displaceable support frame to include a displacing operation control portion which comes in contact with a displacing portion provided on a stationary part of the retractable photographic lens to control a rotation of the displaceable support frame toward the off-axis displaced position so that the displaceable support-frame distance control member rotates in a direction to slide on the rear support-frame distance limiter, the rear support frame distance extending portion and the rear support-frame distance holder in that order when the linearly advancing/retreating ring retreats in the direction toward the imaging plane.

It is desirable for the rear support frame to be supported to be freely movable in the optical axis direction with movement of the rear support frame toward an object side being limited, wherein the rear support frame is biased toward the object side by a spring, and the rear support frame is moved away from the displaceable support frame against a biasing force of the spring when the displaceable support-frame distance control member slidingly contacts the rear support frame distance extending portion.

It is desirable for the radially-displaceable optical element and the rear optical element to be positioned away from each other in a direction orthogonal to the optical axis when the retractable photographic lens is in the retracted state.

It is desirable for the distance extender to include an inclined surface which extends obliquely upwardly rearwardly with respect to a plane orthogonal to the optical axis.

It is desirable for the rear support frame to be guided linearly in the optical axis direction without rotating.

According to the present invention, the radially-displaceable optical element and the rear optical element can be made to be positioned with a minimum distance therebetween by the distance controller in a ready-to-photograph state; moreover, the radially-displaceable optical element and the rear optical element are sufficiently spaced from each other by a distance that prevents the radially-displaceable optical element and the rear optical element from interfering with each other when the radially-displaceable optical element is radially displaced to the off-axis radial (eccentric)) displaced position. Hence, the radially-displaceable optical element and the rear optical element do not interfere with each other, and accordingly, there is no possibility of the radially-displaceable optical element and the rear optical element being either damaged by interference therebetween or malfunctioning. The present disclosure relates to subject matter contained in Japanese Patent Application No. 2009-112041 (filed on May 1, 2009) which is expressly incorporated herein by reference in its entirety.

BRIEF DESCRIPTION OF THE DRAWINGS

The present invention will be described below in detail with reference to the accompanying drawings in which:

FIGS. 9A(1) through 9A(4) are cross sectional views of a main portion of the zoom lens barrel, illustrating the retracting operation thereof in stages when the zoom lens barrel is fully retracted;

FIGS. 9B(1) through 9B(4) are enlarged views of elements of the zoom lens barrel which correspond to the drawings shown in FIGS. 9A(1) through 9A(4), respectively, showing the positional relationship between a distance control bar and a displacing operation control bar as viewed from above;

FIGS. 10A(1) through 10A(3) are cross sectional views of a main portion of the zoom lens barrel, illustrating the retracting operation thereof in stages different from the stages shown in FIGS. 9A(1) through 9A(4) when the zoom lens barrel is fully retracted;

FIGS. 10B(1) through 10B(3) are enlarged views of elements of the zoom lens barrel which correspond to the drawings shown in FIGS. 10A(1) through 10A(3), respectively, showing the positional relationship between the distance control bar and the displacing operation control bar as viewed from above.

DESCRIPTION OF THE PREFERRED EMBODIMENT

Figure 1:
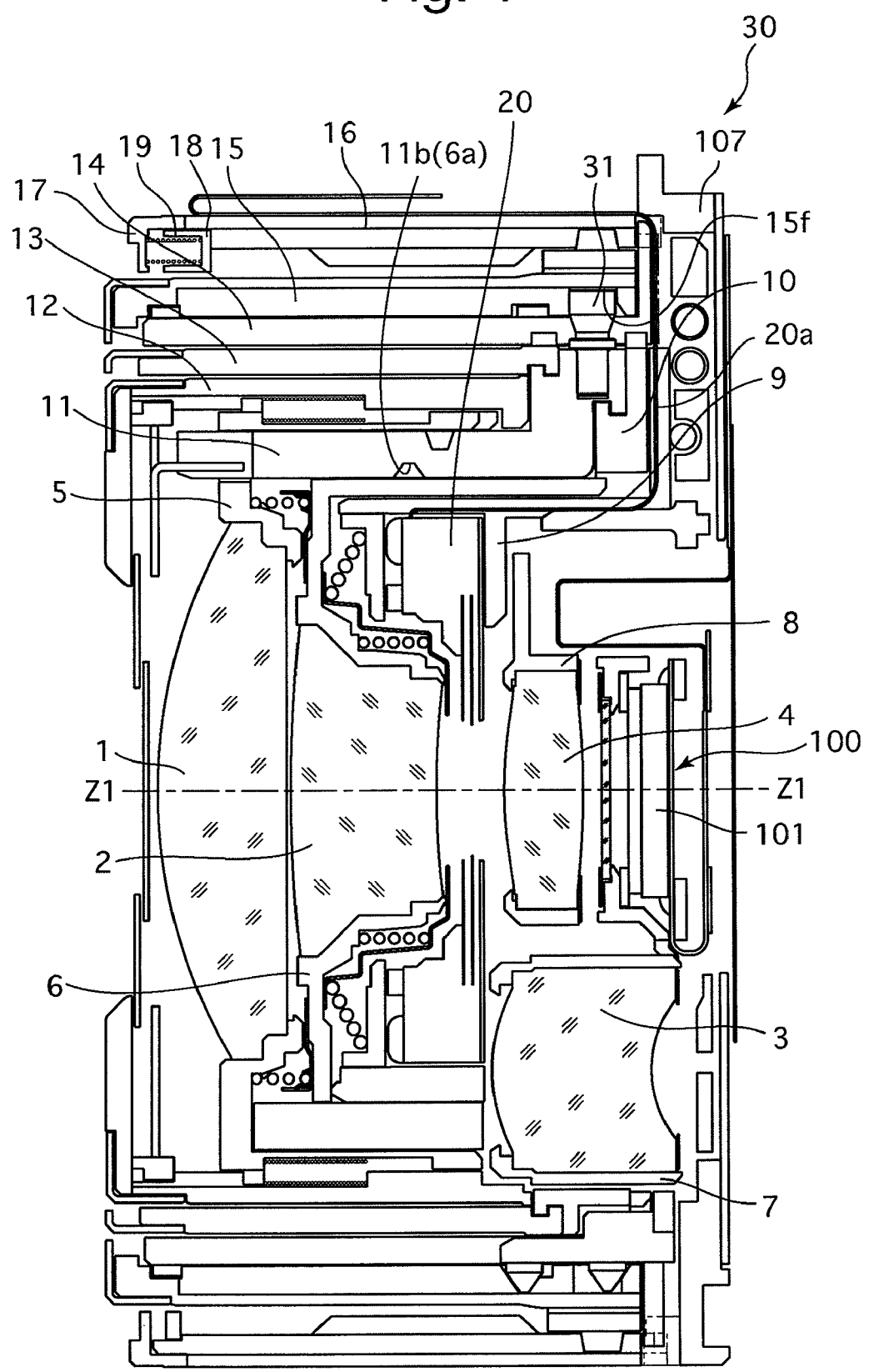
FIG. 1 is a longitudinal sectional view of an embodiment of a zoom lens barrel having a lens frame radially-displacing mechanism according to the present invention, showing the zoom lens barrel in the retracted state (fully-retracted state)
Figure 2:
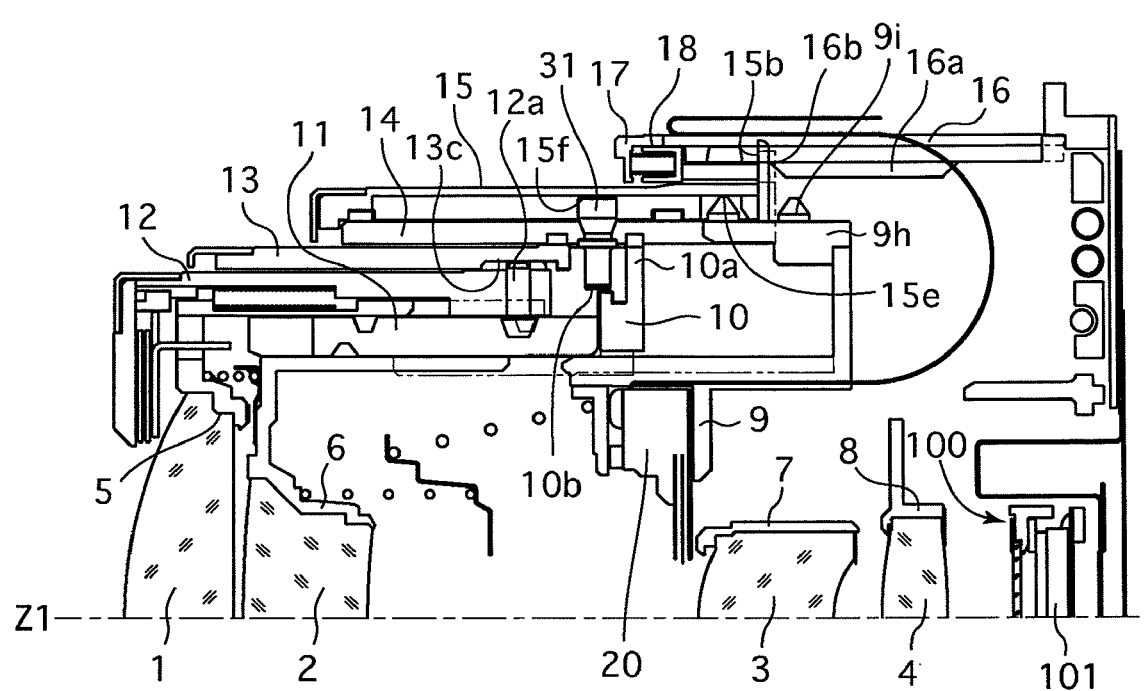
FIG. 2 is a longitudinal sectional view of the zoom lens barrel at the wide-angle extremity in a ready-to-photograph state, showing only an upper half of the zoom lens barrel from the photographing optical axis.
Figure 3:
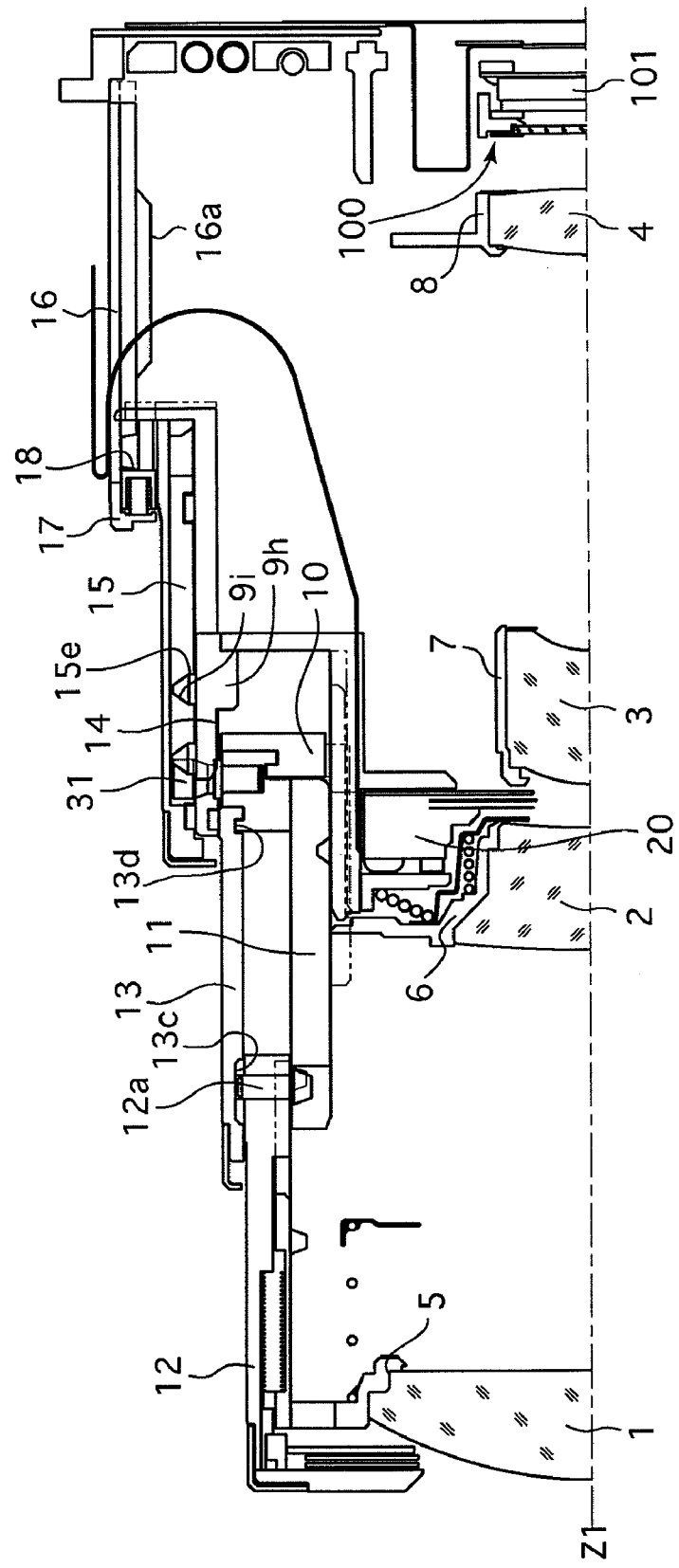
FIG. 3 is a longitudinal sectional view of the zoom lens barrel at the telephoto extremity in a ready-to-photograph state, showing only an upper half of the zoom lens barrel from the photographing optical axis.

The Overall Structure of a Zoom Lens Having a Lens Frame Radially-Displacing Mechanism According to the Present Invention An embodiment of a zoom lens (zoom lens barrel) 30 according to the present invention is of a type which is incorporated in a compact digital camera. The zoom lens 30 is provided with a photographing optical system which includes a first lens group 1, a second lens group 2, a shutter unit 20, a third lens group (radially-displaceable optical element) 3, an AF lens group (fourth lens group/rear optical element) 4 and a CCD or CMOS image sensor (image pickup device) 101, in that order from the object side in a ready-to-photograph state as shown in FIGS. 2 and 3. In the zoom lens 30, a plurality of concentrically-arranged movable barrels (cylindrical members) are telescopically extended toward the object side from the retracted state (fully-retracted state) of the zoom lens 30 (shown in FIG. 1) as shown in FIGS. 2 and 3 when the zoom lens 30 is in a ready-to-photograph state, and the movable barrels are fully retracted as shown in FIG. 1 when the camera is not in use. In a ready-to-photograph state of the zoom lens 30, the center axis/optical axis of each optical element from the first lens group 1 through the image sensor 101 is in common with a photographing optical axis Z1 of the photographing optical system.

A zooming operation is carried out by moving the first lens group 1, the second lens group 2 and the third lens group 3 along the photographing optical axis Z1 in a predetermined moving manner, and a focusing operation is carried out by moving the AF lens group 4 along the photographing optical axis Z1.

[Structure of the Zoom Lens]

The zoom lens 30 incorporates an image shake correcting apparatus (shake reduction unit) 100. The zoom lens 30 equipped with the image shake correcting apparatus 100 will be discussed hereinafter. The zoom lens 30 is provided on the radially outermost side thereof with a stationary barrel (reference barrel) 16 fixed to a camera body to which the zoom lens 30 is mounted, and is provided at a rear end of the stationary barrel 16 with an image shake correcting apparatus 100 on which the image sensor 101 is mounted. The image shake correcting apparatus 100 is fixed to the rear end of the stationary barrel 16. The image shake correcting apparatus 100 drives the image sensor 101 to move in two directions (X and Y directions) perpendicular to each other in a plane orthogonal to the photographing optical axis Z1 to cancel out image shake of an object image captured by the image sensor 101, and this control is performed by a controller (not shown) provided in the digital camera.

The zoom lens 30 is provided at the front end of the stationary barrel 16 with a support ring 17 which is fixed to the front end of the stationary barrel 16 via a biasing ring 18. The support ring 17 is biased forward in the optical axis direction by three compression coil springs 19 (see FIG. 4) which are inserted in between the support ring 17 and the biasing ring 18 at substantially equi-angular intervals about the photographing optical axis O.

Figure 4:
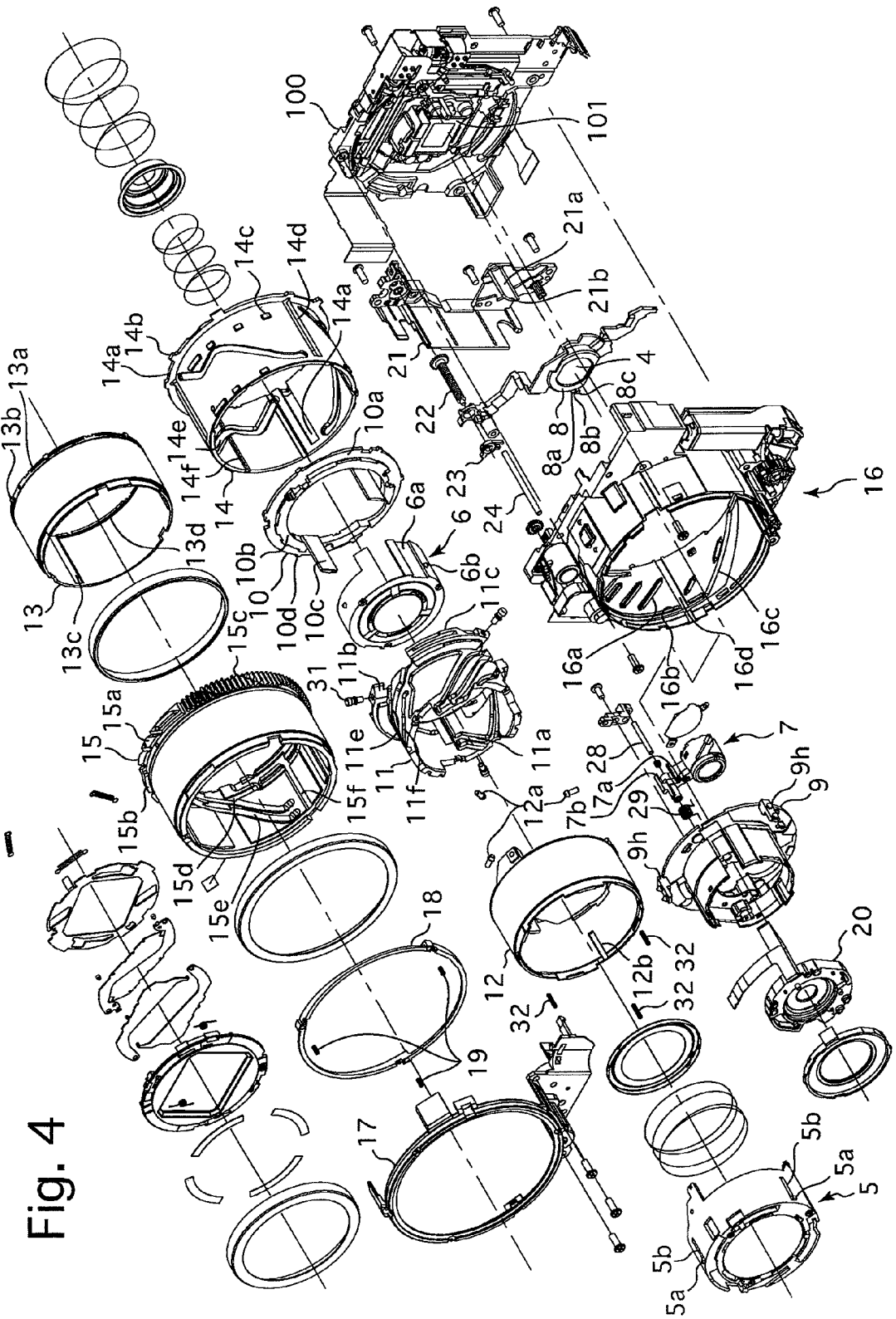
FIG. 4 is an exploded perspective view of some of the elements of the zoom lens barrel.
Figure 5:
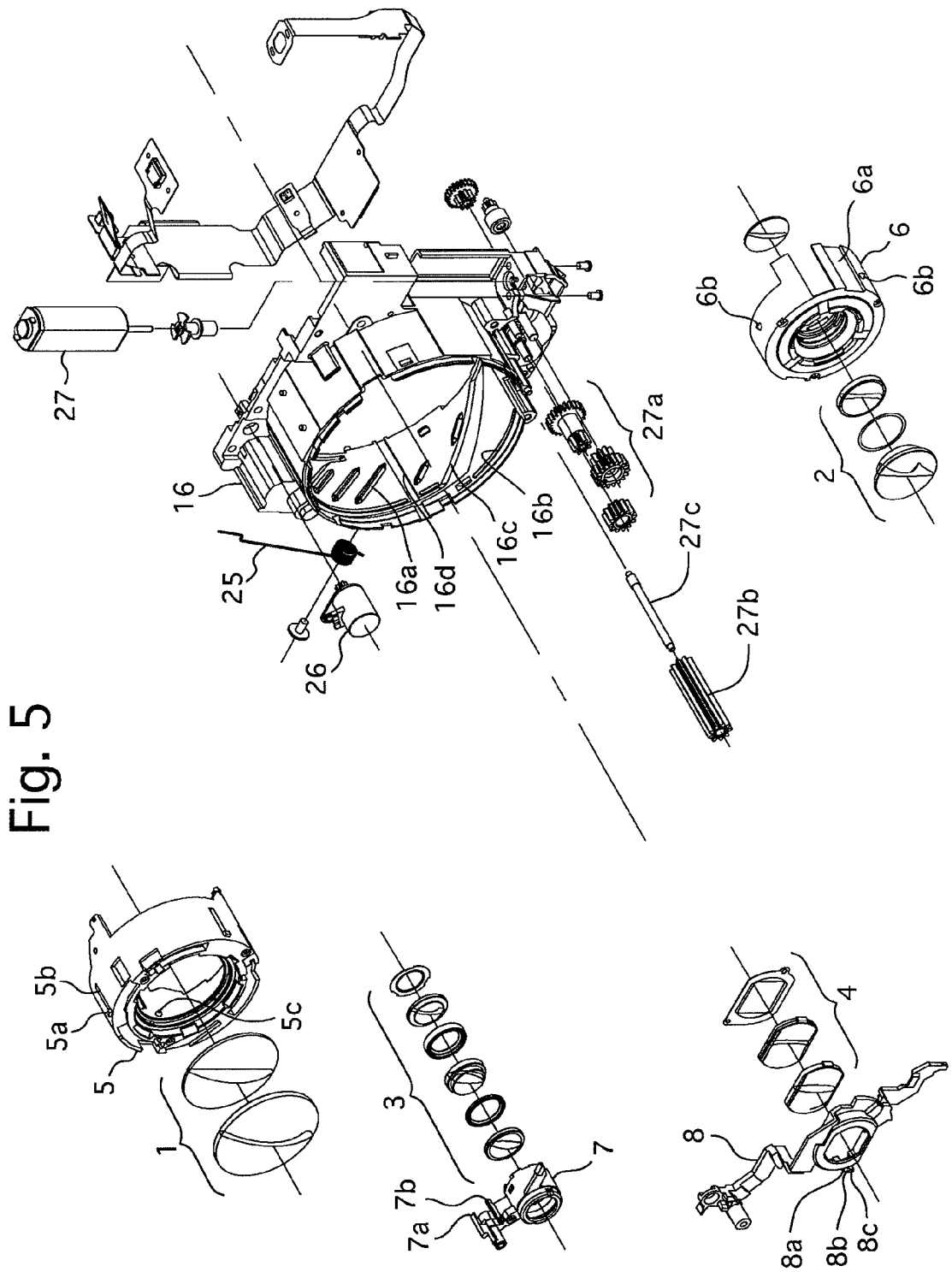
FIG. 5 is an exploded perspective view of some of the elements of zoom lens barrel.
Figure 6:
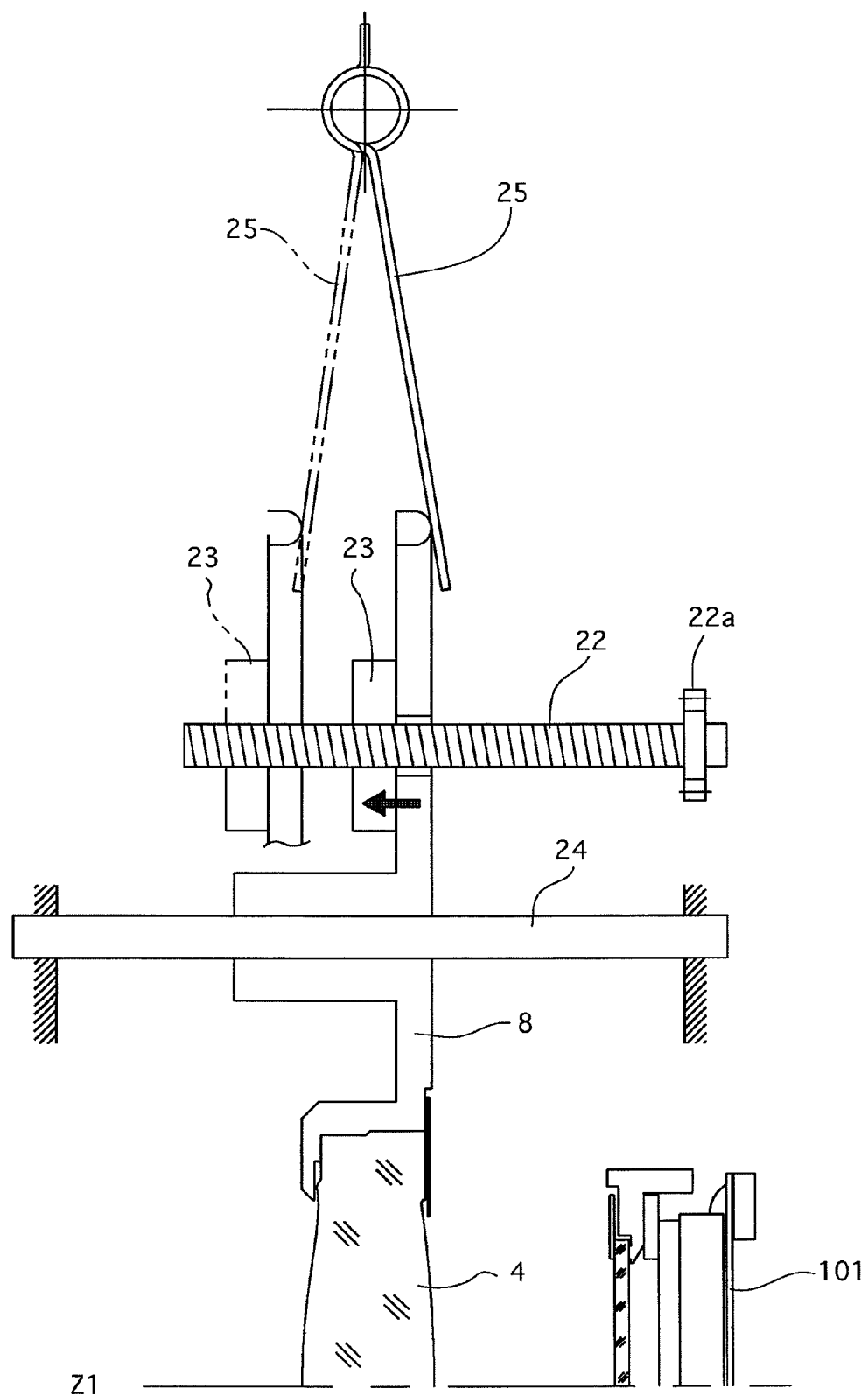
FIG. 6 is a schematic view of a portion of the zoom lens barrel, schematically showing a main part of an AF drive mechanism provided in the zoom lens barrel.

As shown in FIGS. 4, 5 and 6, the zoom lens 30 is provided in the stationary barrel 16 with an AF lens group frame (rear support frame) 8 which holds the AF lens group 4. The AF lens group frame 8 is supported by an AF guide shaft 24 to be freely movable linearly in the optical axis direction while being prevented from rotating. The AF lens group frame 8 is linked with a lead screw 22 and biased forward in the optical axis direction by a fourth-lens-group biasing spring 25 in the form of a torsion spring.

An AF nut 32 is screw-engaged with the lead screw 22 while being prevented from rotating. The AF lens group frame 8 is biased forward in the optical axis direction to abut against the AF nut 23 from behind by the fourth-lens-group biasing spring 25. The lead screw 22 is provided in the vicinity of the rear end thereof with a gear 22a (see FIG. 6) and driven to rotate by an AF motor 26 which is linked with the gear 22a via a gear train (not shown). The AF motor 26 is supported by the stationary barrel 16. Accordingly, rotating the lead screw 22 forward and reverse by the AF motor 26 causes the AF nut 23 to move forward and rearward along the lead screw 22 without rotating with the lead screw 22, thus causing the position of the AF lens group frame 8, which is pressed against the AF nut 23 by the fourth-lens-group biasing spring 25 in the optical axis direction, to vary in accordance with that movement of the AF nut 23. The AF lens group frame 8 can freely move toward the rear (toward the imaging plane) from the AF nut 23 against the biasing force of the fourth-lens-group biasing spring 25.

The zoom lens 30 is provided with a zoom motor 27 which is fixed to a side of the stationary barrel 16 to be supported thereby (see FIG. 5). The driving force of the zoom motor 27 is transmitted to a zoom gear 27b via a reduction gear train 27a. The zoom gear 27b is rotatably fitted on a shaft 27c (see FIG. 5) which is fixed to the stationary barrel 16 to extend parallel to the photographing optical axis Z1. The zoom gear 27b is in mesh with an outer circumferential gear 15c formed on an outer peripheral surface of a helicoid ring (first barrel) 15 (see FIG. 4).

The stationary barrel 16 is provided on an inner peripheral surface thereof with an inner helicoid (helicoidal threads) 16a and small-lead (small lead angle) grooves 16b positioned in front of the inner helicoid 16a. The set of small-lead grooves 16b are formed substantially as a discontinuous ring-shaped groove about the photographing optical axis O, and each small-lead groove 16b is slightly inclined with respect to a plane orthogonal to the photographing optical axis Z1 and has a small lead angle. The helicoid ring 15 is provided on an outer peripheral surface thereof with an outer helicoid 15a which is engaged with the inner helicoid 16a of the stationary barrel 16. Due to the lead of the outer helicoid 15a and the inner helicoid 16a, the helicoid ring 15 moves in the optical axis direction while rotating.

Upon the helicoid ring 15 advancing to a predetermined forward position (wide-angle extremity position), a set of guide projections 15b formed on an outer peripheral surface of the helicoid ring 15 enter the set of small-lead grooves 16b, respectively, so that the helicoid ring 15 slightly moves in the optical axis direction while rotating relative to the stationary barrel 16 when the helicoid ring 15 is rotated.

The stationary barrel 16 is further provided on an inner peripheral surface thereof with a set of lead grooves 16c which are communicatively connected at the front ends thereof to the set of small-lead grooves 16b, respectively, and which extend parallel to threads of the inner helicoid 16a. The set of guide projections 15b of the helicoid ring 15 remain engaged in the set of lead grooves 16c, respectively, during the time the inner helicoid 16a and the outer helicoid 15a are engaged with each other. Both sides of each guide projection 15b in the circumferential direction of the helicoid ring 15 are formed as a pair of inclined surfaces parallel to the associated lead groove 16c, and each guide projection 15b is movable along the associated lead groove 16c with the pair of inclined surfaces being in sliding contact with the pair of opposed side walls of the associated lead groove 16c, respectively. On the other hand, each of the front and rear surfaces of each guide projection 15b in the optical axis direction is formed as a flat surface slightly inclined to a plane orthogonal to the photographing optical axis Z1. Each guide projection 15b moves in the optical axis direction with a small lead pitch with the front and rear circumferential flat surfaces of each guide projection 15b being in sliding contact with the opposed side walls (front and rear side walls) of the associated small-lead groove 16b, respectively, when the set of guide projections 15b are positioned in the set of small-lead grooves 16b, respectively.

The zoom lens 30 is provided with a first linear guide ring 14 which is positioned inside the helicoid ring 15 and supported thereby. The first linear guide ring 14 is provided with an annular flange 14a which projects radially outwards from the rear end of the first linear guide ring 14, and is provided on the annular flange 14a with a plurality of linear guide projections 14b which project radially outward from the annular flange 14a. The first linear guide ring 14 is guided linearly in the optical axis direction relative to the stationary barrel 16 via the engagement of the plurality of linear guide projections 14b with a plurality of linear guide grooves 16d (only one of which appears in FIG. 4).

In addition, the first linear guide ring 14 is provided on an outer peripheral surface thereof with a plurality of rotational guide projections 14c, and the helicoid ring 15 is provided on an inner peripheral surface thereof with a circumferential groove 15d in which the plurality of rotational guide projections 14c are engaged. Additionally, the annular flange 14a is in contact with the rear end surface of the helicoid ring 15 to be slidable thereon. Accordingly, due to the engagement of the plurality of rotational guide projections 14c with the circumferential groove 15d and the engagement of the annular flange 14a with the rear end surface of the helicoid ring 15, the first linear guide ring 14 and the helicoid ring 15 are coupled to each other to be integrally movable in the optical axis direction while allowing rotation of the helicoid ring 15 relative to the first linear guide ring 14.

The first linear guide ring 14 is provided with a set of linear guide slots (through-slots) 14d which extend parallel to the photographing optical axis Z1. The zoom lens 30 is provided inside the helicoid ring 15 with a third lens group moving ring (third-lens-group support ring/linearly advancing/retreating ring) 9. The third lens group moving ring 9 is guided linearly in the optical axis direction due to the engagement of a set of linear guide keys 9h which radially project from the third lens group moving ring 9 with the set of linear guide slots 14d of the first linear guide ring 14. Each linear guide slot 14d is formed through the first linear guide ring 14 in a radial direction, and the third lens group moving ring 9 is provided with a plurality of third-lens-group-control cam followers 9i which are formed on the linear guide keys 9h and project radially outwards from the set of linear guide slots 14d, respectively. The plurality of third-lens-group-control cam followers 9i are engaged in a corresponding plurality of third-lens-group guide cam grooves 15e formed on an inner peripheral surface of the helicoid ring 15, respectively. The plurality of third-lens-group-control cam followers 9i and the plurality of third-lens-group guide cam grooves 15e are used for moving the third lens group 3 in the optical axis direction. Each third-lens-group guide cam groove 15e is provided with a movement-control groove portion and a circumferential groove portion. The movement-control groove portion of each third-lens-group guide cam groove 15e is inclined to a plane orthogonal to the photographing optical axis Z1 at a predetermined angle of inclination, and the circumferential groove portion of each third-lens-group guide cam groove 15e is communicatively connected to the rear end of the movement-control groove portion of the associated third-lens-group guide cam groove 15e, lies in a plane orthogonal to the photographing optical axis Z1 and has no lead angle (i.e., the lead angle is zero). When the plurality of third-lens-group-control cam followers 9i are positioned in the movement-control groove portions of the plurality of third-lens-group guide cam grooves 15e, respectively, a rotation of the helicoid ring 15 causes the third lens group moving ring 9, which is guided linearly by the first linear guide ring 14, to move in the optical axis direction relative to the helicoid ring 15 and the first linear guide ring 14 in accordance with the contours of the movement-control groove portions of the plurality of third-lens-group guide cam grooves 15e.

On the other hand, when the plurality of third-lens-group-control cam followers 9i are positioned in the circumferential groove portions of the plurality of third-lens-group guide cam grooves 15e, respectively, a rotation of the helicoid ring 15 causes the third lens group moving ring 9 to move together with a linear movement of the helicoid ring 15 in the optical axis direction. The plurality of third-lens-group guide cam grooves 15e are provided as three pairs of cam grooves 15e at three different positions in the circumferential direction of the helicoid ring 15, and each pair of cam grooves 15e includes a front cam groove 15e and a rear cam groove 15e positioned behind the front cam groove 15e in the optical axis direction. In each pair of cam grooves 15e, the circumferential groove portion of the rear cam groove 15e is open at the rear end of the helicoid ring 15. To correspond to the plurality of third-lens-group guide cam grooves 15e, the plurality of third-lens-group-control cam followers 9i consist of three pairs of cam followers 9i at three different positions in the circumferential direction of the third lens group moving ring 9, and each pair of cam followers 9i consists of a front cam follower 9i and a rear cam follower 9i positioned behind the front cam follower 9i in the optical axis direction.

As shown in FIG. 4, the zoom lens 30 is provided inside the third lens group moving ring 9 with a third lens group frame (radially-displaceable support frame) 7 which is pivoted about a pivot shaft 28 which extends parallel to the photographing optical axis Z1. The third lens group frame 7 holds the third lens group 3 at a position eccentric to the pivot shaft 28 with the optical axis of the third lens group 3 extending parallel to the pivot shaft 28. The third lens group frame 7 is rotatable (swingable) about the pivot shaft 28 between an on-axis position (photographing position) (shown in FIGS. 2 and 3), at which the optical axis (center) of the third lens group 3 coincides with the photographing optical axis Z1, and an off-axis displaced position (radially retracted away from the photographing optical axis Z1; radially-displaced position) (shown in FIG. 1) at which the optical axis of the third lens group 3 is eccentrically positioned with respect to the photographing optical axis Z1. The third lens group frame 7 is biased to rotate in a direction toward the on-axis position by a torsion spring 29 to be held in the on-axis position.

On the other hand, a rearward movement of the third lens group moving ring 9 in the optical axis direction causes a displacing operation control bar (displacing operation control portion) 7b which is formed on the third lens group frame 7 to come into contact with a displacing cam bar (displacing portion) 21a formed on a support plate 21 fixed to the stationary barrel 16, and a further rearward movement of the third lens group moving ring 9 in the optical axis direction causes the third lens group frame 7 to rotate to the radially retracted position (off-axis displaced position) against the biasing force of the torsion spring 29. More specifically, a displacing cam surface 21b having a predetermined degree of inclination relative to the optical axis direction is formed on a front end surface of the displacing cam bar 21a, and the displacing operation control bar 7b is formed on the third lens group frame 7 so as to face the displacing cam surface 21b when the third lens group frame 7 that holds the third lens group 3 is in the on-axis position. Upon the third lens group moving ring 9 closely approaching the image shake correcting apparatus 100 while moving rearward, the displacing operation control bar 7b comes into contact with the displacing cam surface 21b, and a further rearward movement of the third lens group moving ring 9 causes a component force which rotates the third lens group frame 7 to be produced from the rearward moving force in the optical axis direction, thus rotating the third lens group frame 7 along the displacing cam surface 21b to displace the third lens group frame 7 (the third lens group 3) to the radially retracted position (off-axis displaced position).

The third lens group frame 7 (the third lens group 3) having been rotated to the off-axis displaced position is accommodated in a lower position where neither the third lens group frame 7 nor the third lens group 3 interferes with either the AF lens group 4 or the image sensor 101. In addition, the zoom lens 30 is provided inside the third lens group moving ring 9 with a shutter unit 20 which is fixed to the third lens group moving ring 9 to be positioned in front of the third lens group frame 7. Although not shown in the drawings, a shutter and an adjustable diaphragm are incorporated in the shutter unit 20.

The first linear guide ring 14 is provided with a set of roller-guiding cam slots 14e which are formed through inner and outer peripheral surfaces of the first linear guide ring 14. The zoom lens 30 is provided radially inside the first linear guide ring 14 with a cam ring 11 rotatable about the optical axis Z1. A set of guide rollers (followers) 31 fixed to the cam ring 11 at different circumferential positions thereon to project radially outwards are slidably engaged in the set of roller-guiding cam slots 14e, respectively. The set of guide rollers extend radially outwards through the set of roller-guiding cam slots 14e to be engaged in a set of roller-engaging grooves 15f which are formed on an inner peripheral surface of the helicoid ring 15, respectively. Each roller-engaging groove 15f is provided with a rotational transfer groove portion and a circumferential groove portion. The rotational transfer groove portion extends parallel to the photographing optical axis Z1, while the circumferential groove portion is communicatively connected to the rear end of the rotational transfer groove portion of the associated roller-engaging groove, lies in a plane orthogonal to the photographing optical axis Z1 and does not have axial-direction component (i.e., the lead angle is zero). When the set of guide rollers 31 are positioned in the rotational transfer groove portions of the set of roller-engaging grooves 15f, respectively, a rotational force of the helicoid ring 15 is transferred to the set of guide rollers 31 via wall surfaces of the rotational transfer groove portion of each roller-engaging groove 15f when the helicoid ring 15 is rotated, and accordingly, the cam ring 11 rotates integrally with the helicoid ring 15 when the helicoid ring 15 is rotated. This rotation of the cam ring 11 causes the cam ring 11 to move in the optical axis direction while rotating relative to the helicoid ring 15 and the first linear guide ring 14 in accordance with the contours of the set of roller-guiding cam slots 14e, in which the set of guide rollers 31 are engaged, respectively. On the other hand, when the set of guide rollers 31 are positioned in the circumferential groove portions of the set of roller-engaging grooves 15f, respectively, no rotational force of the helicoid ring 15 is transferred to the cam ring 11 even if the helicoid ring 15 rotates, because each guide roller 31 moves in the circumferential groove portion of the associated roller-engaging groove 15f.

The zoom lens 30 operates in a manner which will be discussed hereinafter when the zoom motor 27 rotates. Driving the zoom motor 27 to rotate in a lens barrel advancing direction causes the helicoid ring 15 to advance while rotating due to the engagement of the inner helicoid 16a with the outer helicoid 15a. This advancing and rotating movement of the helicoid ring 15 causes the first linear guide ring 14 to move linearly forward with the helicoid ring 15. Upon the helicoid ring 15 and the first linear guide ring 14 being advanced by a predetermined amount of movement, the outer helicoid 15a and the inner helicoid 16a are disengaged from each other, and the set of guide projections 15b of the helicoid ring 15 are engaged in the set of small-lead grooves 16b of the stationary barrel 16, respectively. Thereafter, the helicoid 15 moves in the optical axis direction with a small lead pitch while rotating relative to the stationary barrel 16. According to this movement of the helicoid 15, the first linear guide ring 14 also moves in the optical axis direction with a small lead pitch from the position where the first linear guide ring 14 is advanced forward in the optical axis direction.

The position of the third lens group moving ring 9 in the optical axis direction, which is guided linearly by the first linear guide ring 14, is controlled by the plurality of third-lens-group guide cam grooves 15e of the helicoid ring 15. Namely, when the plurality of third-lens-group-control cam followers 9i are positioned in the circumferential groove portions of the plurality of third-lens-group guide cam grooves 15e, respectively, the relative position between the helicoid ring 15 and the third lens group moving ring 9 in the optical axis direction does not vary; however, the position of the third lens group moving ring 9 in the optical axis direction relative to the image shake correcting apparatus 100 varies in accordance with variations in position of the helicoid ring 15 that is advanced due to the engagement between the outer helicoid 15a and the inner helicoid 16a. In addition, once the plurality of third-lens-group-control cam followers 9i enter the movement-control groove portions of the plurality of third-lens-group guide cam grooves 15e, respectively, a rotation of the helicoid ring 15 causes the third lens group moving ring 9 to move relative to the helicoid ring 15 in the optical axis direction in accordance with the lead of the movement-control groove portions of the plurality of third-lens-group guide cam grooves 15e.

The position of the cam ring 11 in the optical axis direction is controlled by the engagement of the set of roller-guiding cam slots 14e of the first linear guide ring 14 with the set of roller-engaging grooves 15f that are formed on an inner peripheral surface of the helicoid ring 15. Namely, when the set of guide rollers 31 are positioned in the circumferential groove portions of the set of roller-engaging grooves 15f, respectively, the cam ring 11 does not follow the rotation of the helicoid ring because each guide roller 31 moves in the circumferential groove portion of the associated roller-engaging groove 15f, so that the position of the cam ring 11 relative to the helicoid ring 15 in the optical axis direction does not change. However, the position of the cam ring 11 relative to the image shake correcting apparatus 100 in the optical axis direction varies in accordance with variations in position of the helicoid ring 15 that is advanced due to the engagement between the outer helicoid 15a and the inner helicoid 16a. Upon the set of guide rollers 31 entering the rotational transfer groove portions of the set of roller-engaging grooves 15f, respectively, a rotation of the helicoid ring 15 causes the cam ring 11 to rotate with the helicoid ring 15, thus causing the cam ring 11 to move in the optical axis direction while rotating relative to the first linear guide ring 14 in accordance with the contours of the set of roller-guiding cam slots 14e.

As shown in FIG. 4, the linear guide ring 14 is provided on an inner peripheral surface thereof with a plurality of linear guide grooves (bottomed grooves) 14f which extend parallel to the photographing optical axis Z1, independently of the set of linear guide slots 14d that are used for guiding the third lens group moving ring 9 linearly in the optical axis direction. The zoom lens 30 is provided inside the first linear guide ring 14 with a second linear guide ring 10 and a middle external barrel (second barrel) 13, each of which is guided linearly in the optical axis direction by the plurality of linear guide grooves 14f. The middle external barrel 13 advances from and retracts into the helicoid ring 15.

The second linear guide ring 10 is provided with a rear end flange 10a, a small-diameter flange 10b and a pair of guide keys 10c. The rear end flange 10a is formed in a plane substantially orthogonal to the photographing optical axis Z1, the small-diameter flange 10b is positioned in front of the rear end flange 10a with a predetermined spacing (distance) therebetween, and the pair of guide keys 10c project forward from the position of the small-diameter flange 10b, extending parallel to the photographing optical axis Z1. The rear end flange 10a is provided with a plurality of linear guide projections 10d which project radially outwards. The second linear guide ring 10 is guided linearly in the optical axis direction by making the plurality of linear guide projections 10d engaged in the plurality of linear guide grooves 14f to be slidingly movable therein in the optical axis direction. The cam ring 11 is provided at the rear end thereof with a plurality of rotation guide projections (not shown) which project radially inwards and are engaged in between the rear end flange 10a and the small-diameter flange portion 10b in a manner to be prevented from moving in the optical axis direction relative to the second linear guide ring 10 and to be allowed to rotate relative to the second linear guide ring 10. Due to this engagement, the cam ring 11 and the second linear guide ring 10 are coupled to each other to be rotatable relative to each other and to be movable together in the optical axis direction.

The zoom lens 30 is provided inside the cam ring 11 with a second lens group frame 6 which holds the second lens group 2. The pair of guide keys 10c of the second linear guide ring 10 are engaged in a pair of linear grooves 6a, respectively, which are formed on the second lens group frame 6 to extend parallel to the photographing optical axis Z1. Due to the engagement of the pair of guide keys 10c with the pair of linear grooves 6a, the second lens group frame 6 is guided linearly in the optical axis direction. The second lens group frame 6 is provided on an outer peripheral surface thereof with second-lens-group-control cam followers 6b which are respectively engaged in second-lens-group guide cam grooves 11a formed on an inner peripheral surface of the cam ring 11. A rotation of the cam ring 11 causes the second lens group frame 6 to move in the optical axis direction due to the engagement of the second-lens-group guide cam grooves 11a with the second-lens-group-control cam followers 6b.

The middle external barrel 13 is provided, on an outer peripheral surface thereof in the vicinity of the rear end of the middle external barrel 13, with an annular flange 13a, and is provided on the annular flange 13a with a plurality of linear guide projections 13b which are slidably engaged in the plurality of linear guide grooves 14f of the first linear guide ring 14, respectively. The middle external barrel 13 is guided linearly in the optical axis direction due to the engagement of the plurality of linear guide projections 13b with the plurality of linear guide grooves 14f. The middle external barrel 13 is provided on an inner peripheral surface thereof with a set of linear guide grooves 13c which extend parallel to the photographing optical axis Z1, and is provided at the rear end of the inner peripheral surface of the middle external barrel 13 with a plurality of rotation guide projections 13d which project radially inwards. The cam ring 11 is provided, on an outer peripheral surface thereof in the vicinity of the rear end of the cam ring 11, with a rear end flange 11b which projects radially outwards and a small-diameter flange 11c positioned in front of the rear end flange 11b with a predetermined spacing provided therebetween. The radially inner ends (fixed ends) of the guide rollers 31 are embedded into the rear end flange 11b. The plurality of rotation guide projections 13d of the middle external barrel 13 are engaged in between the rear end flange 11b and the small-diameter flange 11c in a manner to prevent the middle external barrel 13 from moving in the optical axis direction relative to the cam ring 11 and to allow the middle external barrel 13 to rotate relative to the cam ring 11. Due to this engagement, the cam ring 11 and the middle external barrel 13 are coupled to each other to be rotatable relative to each other and to be movable together in the optical axis direction. The zoom lens 30 is provided immediately inside the middle external barrel 13 with a frontmost external barrel (third barrel) 12 which advances from and retracts into the middle external barrel 13. The frontmost external barrel 12 is provided on an outer peripheral surface thereof with followers 12a which are engaged in the linear guide grooves 13c of the middle external barrel 13, respectively. The frontmost external barrel 12 is guided linearly in the optical axis direction due to the engagement of the followers 12a with the linear guide grooves 13c.

The frontmost external barrel 12 is provided on an inner peripheral surface thereof with linear guide grooves 12b which are formed so as to extend parallel to the photographing optical axis Z1. The zoom lens 30 is provided inside the frontmost external barrel 12 with a first lens group frame 5 which holds the first lens group 1. The first lens group frame 5 is provided on an outer peripheral surface thereof with guide projections 5a which are engaged in the linear guide grooves 12b to be movable therein in the optical axis direction, respectively. Due to the engagement of the linear guide grooves 12b with the guide projections 5a, the frontmost external barrel 12 and the first lens group frame 5 are coupled to each other in a manner to be prevented from rotating relative to each other and to be allowed to move relative to each other in the optical axis direction. Namely, the first lens group frame 5 is also guided linearly in the optical axis direction via the frontmost external barrel 12. The first lens group frame 5 is provided on an outer peripheral surface thereof with a set of linear grooves 5b which extend rearward from the set of guide projections 5a, respectively. The set of linear grooves 5b and the set of linear guide grooves 12b form three spring accommodation spaces in which three first lens group biasing springs 32 are accommodated, respectively. Each of the three first lens group biasing springs 32 is a compression coil spring. The front and rear ends of each first lens group biasing spring 32 are in contact with the associated guide projection 5a and the rear end surface of the associated linear guide groove 12b, respectively.

The frontmost external barrel 12 is provided, on an inner peripheral surface thereof in the vicinity of the rear end of the frontmost external barrel 12, with followers 12a, the shaft portions of which are press-fitted into fixing holes formed through the frontmost external barrel 12, and the first lens group frame 5 is provided on an inner peripheral surface thereof with a plurality of first-lens-group-control cam followers 5c (only one of which is shown in FIG. 5). The followers 12a (which project radially inwards) of the frontmost external barrel 12 are slidably engaged in first nonlinear cam grooves 11e, respectively, which are formed on an outer peripheral surface of the cam ring 11, while the plurality of first-lens-group-control cam followers 5c are slidably engaged in a corresponding plurality of second nonlinear cam grooves 11f, respectively, which are formed on an outer peripheral surface of the cam ring 11. A rotation of the cam ring 11 causes the followers 12a to move along the set of first nonlinear cam grooves 11e therein while being guided thereby, respectively, thus causing the frontmost external barrel 12 to move in the optical axis direction relative to the cam ring 11. In addition, a rotation of the cam ring 11 causes the plurality of first-lens-group-control cam followers 5c to move along the plurality of second nonlinear cam grooves 11f therein while being guided thereby, respectively, thus causing the first lens group frame 5 to move in the optical axis direction relative to the cam ring 11.

[The Lens Frame Radially-Displacing Mechanism]

Figure 7:
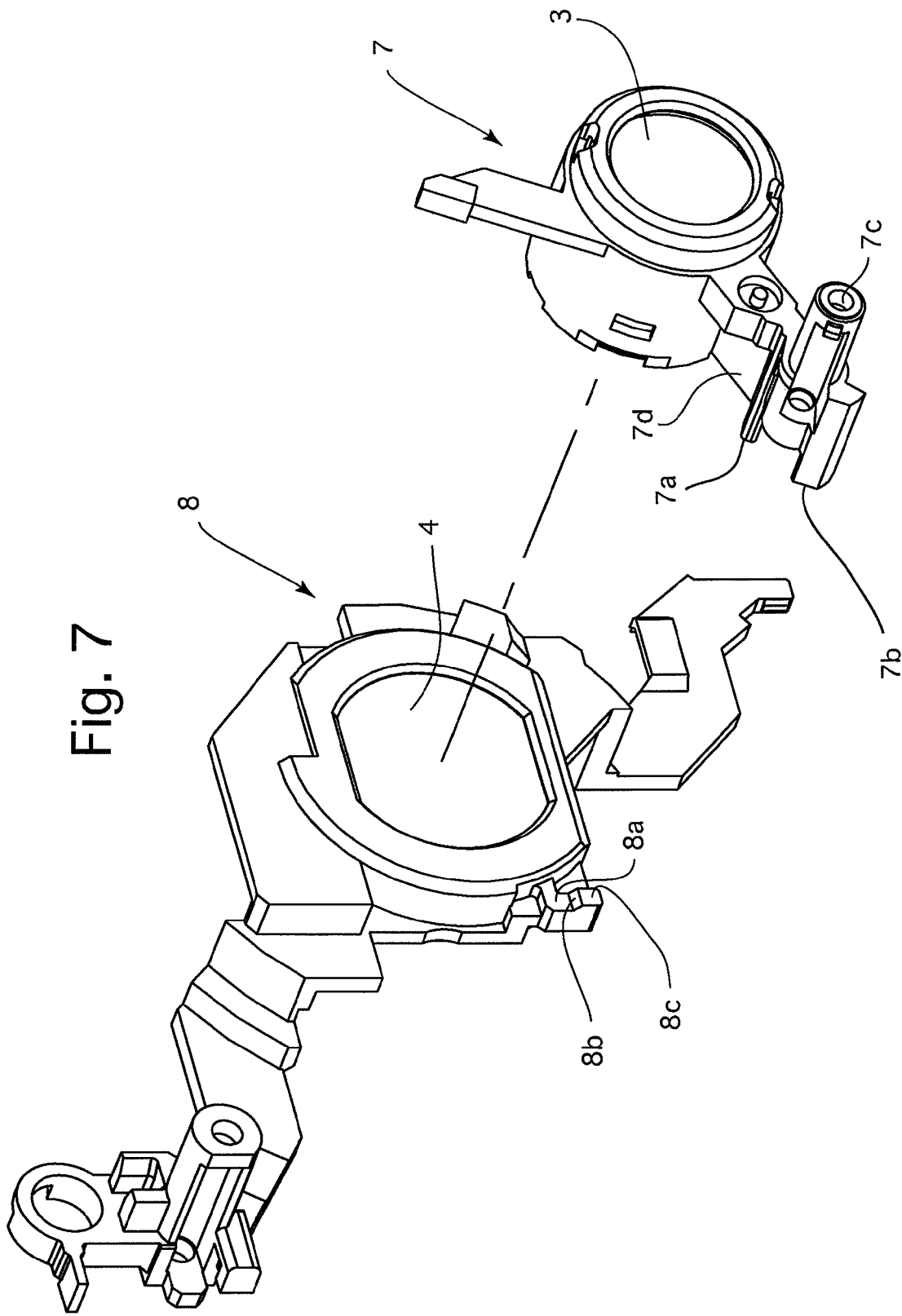
FIG. 7 is a perspective view of an AF lens group frame and a third lens group frame of the zoom lens barrel.

Main elements of the lens frame radially-displacing mechanism will be hereinafter discussed with reference to FIG. 7. FIG. 7 is a perspective view of the third lens group frame 7 and the AF lens group frame 8 of the zoom lens 30, viewed obliquely from the object side at a different angle from that of FIG. 4. The third lens group frame 7 is provided with an arm 7d which projects from the cylindrical portion of the third lens group frame 7 that holds the third lens group 3, and is further provided on the arm 7d with a distance control bar 7a and a displacing operation control bar 7b both of which project toward the AF lens group frame 8 from the arm 7d. The distance control bar 7a serves as a displaceable support-frame distance control member. The distance control bar 7a and the displacing operation control bar 7b are arranged in that order from the photographing optical axis Z1. A shaft hole 7c is formed through a small cylindrical part provided on the arm 7d of the third lens group frame 7 between the distance control bar 7a and the displacing operation control bar 7b.

On the other hand, the AF lens group frame 8 is provided, on a surface thereof on the object side (on the side facing the third lens group 3), with a approaching-position limiting surface (rear support-frame distance limiter) 8a, a distance-extending cam surface (distance extender) 8b and a distance holding surface (rear support-frame distance holder) 8c. The approaching-position limiting surface 8a serves as a rear support-frame distance limiter, and the distance-extending cam surface 8b and the distance holding surface 8c serve as a rear support frame distance extending portion. The distance control bar 7a and the approaching-position limiting surface 8a constitute an approaching-position limiter and are formed at positions where the respective distances from the photographing optical axis Z1 are mutually identical and where the distance control bar 7a and the approaching-position limiting surface 8a come into contact with each other when closely approaching each other in the optical axis direction. In addition, the approaching-position limiting surface 8a, the distance-extending cam surface 8b and the distance holding surface 8c are formed so that the front end of the distance control bar 7a can slide thereon when the third lens group frame 7 swings about the pivot shaft 28.

The approaching-position limiting surface 8a and the distance holding surface 8c are formed parallel to a plane orthogonal to the photographing optical axis Z1, and the distance holding surface 8c is provided at a position closer to the third lens group frame 7 in the photographing optical axis Z1 direction than the approaching-position limiting surface 8a. Namely, the state where the distance control bar 7a is in contact with the approaching-position limiting surface 8a corresponds to the state where the third lens group 3 is positioned close to the AF lens group 4 with a minimum distance therebetween. In this state, if the third lens group frame 7 that holds the third lens group 3 were to move in a direction orthogonal to the photographing optical axis Z1, the third lens group frame 7 would interfere with a front surface of the AF lens group 4. On the other hand, the state where the distance control bar 7a is in contact with the distance holding surface 8c corresponds to a state where the third lens group frame 7 (third lens group 3) does not interfere or come in contact with either the AF lens group 4 or the AF lens group frame 8 even if the third lens group frame 7 were to move in a direction orthogonal to the photographing optical axis Z1 with the distance control bar 7a being in contact with the distance holding surface 8c of the AF lens group frame 8. The approaching-position limiting surface 8a, the distance-extending cam surface 8b, the distance holding surface 8c and the distance control bar 7a constitute a distance controller.

The displacing operation control bar 7b is formed on the third lens group frame 7 at a position capable of coming into contact with the displacing cam surface 21b of the displacing cam bar 21a that is shown in FIG. 4 when the third lens group frame 7 moves rearward, toward the fully retracted position, from the photographing position while holding the third lens group 3 on the photographing optical axis Z1. A rearward movement of the third lens group frame 7 causes the displacing operation control bar 7b to come into contact with the displacing cam surface 21b and subsequently slide thereon along the inclination of the displacing cam surface 21b so that the third lens group frame 7 rotates about the pivot shaft 28 in a direction toward the off-axis displaced position. A further rearward movement of the third lens group frame 7 to the off-axis displaced position causes the displacing operation control bar 7b to slidingly move from the displacing cam surface 21b of the displacing cam bar 21a onto a side edge of the displacing cam bar 21a which extends in the optical axis direction. This engagement of the displacing operation control bar 7b with the side edge of the displacing cam bar 21a prevents the third lens group frame 7 from rotating back to the on-axis position by the biasing force of the torsion spring 29.

[The Retracting Operation of the Zoom Lens]

Figure 8:
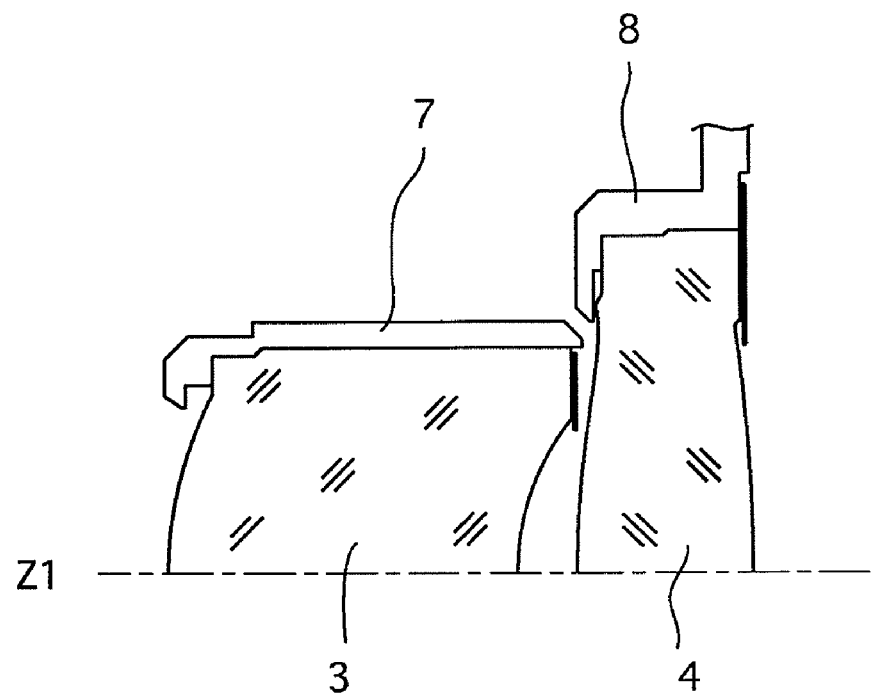
FIG. 8 is a longitudinal sectional view of a portion of the zoom lens barrel, showing a state where the third lens group frame and the AF lens group frame are positioned close to each other with a minimum distance therebetween.
Figures 11A, 11B:
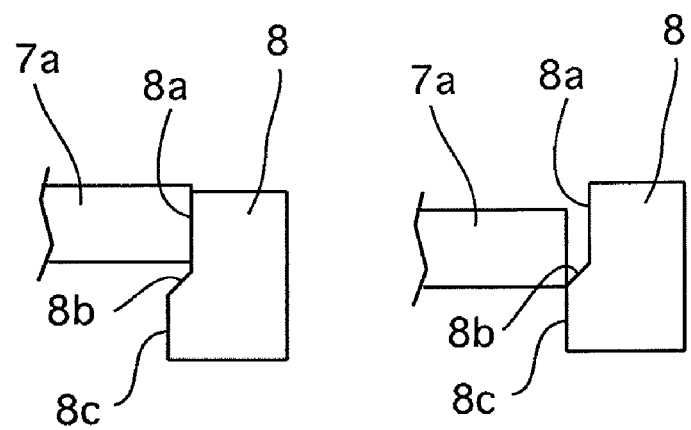
FIGS. 11A and 11B are enlarged views of engageable portions of the third lens group frame and the AF lens group frame in different states, showing the positional relationship between the distance control bar and each of an approaching-position limiting surface, a distance-extending cam surface and a distance holding surface which are formed on the AF lens group frame, as viewed from above.

Operations of the zoom lens 30 when retracted to the fully-retracted state will be hereinafter discussed with reference to FIGS. 8 through 11. FIG. 8 is a longitudinal sectional view of a portion of the zoom lens 30, showing a state where the third lens group 3 and the AF lens group 4 are positioned close to each other with a minimum distance therebetween, FIGS. 9A(1) through 10B(3) show a manner of movement of the third lens group 3 from the wide-angle extremity position to the off-axis displaced position (accommodated position) in stages, wherein FIGS. 9A(1), 9A(2), 9A(3), 9A(4), 10A(1), 10A(2) and 10A(3) show a main portion of the zoom lens 30, and 9B (1), 9B(2), 9B(3), 9B (4), 10B(1), 10B(2) and 10B(3) show the positional relationship between the distance control bar 7a and the AF lens group frame 8 and the positional relationship between the displacing operation control bar 7b and displacing cam bar 21a, and FIG. 11A and 11B show the positional relationship between the distance control bar 7a and the AF lens group frame 8 in enlarged views.

[Wide-Angle Extremity]

FIGS. 9A(1) and 9B(1) show a state where the zoom lens 30 is at the wide-angle extremity. In this state, the rear end surface of the distance control bar 7a faces the approaching-position limiting surface 8a of the AF lens group frame 8 and is spaced apart therefrom by a predeterminate distance. On the other hand, with the zoom lens 30 at the wide-angle extremity, the displacing operation control bar 7b positioned away from the displacing cam surface 21b of the displacing cam bar 21a. The third lens group 3 (and the third lens group frame 7) and the AF lens group 4 (and the AF lens group frame 8) are sufficiently spaced apart from each other so as not to interfere with each other even if third lens group 3 (and the third lens group frame 7) moves in a direction orthogonal to the photographing optical axis Z1.

[Extremely Closely Positioned State]

FIGS. 9A(2) and 9B(2) show a state where the third lens group frame 7 together with the third lens group moving ring 9 has moved linearly rearward from the wide-angle extremity position to a position where the rear end surface of the distance control bar 7a is in contact with the approaching-position limiting surface 8a of the AF lens group frame 8 with the third lens group 3 and the AF lens group 4 being positioned close to each other with a minimum distance therebetween. In this state, the third lens group 3 and the third lens group frame 7 are positioned close to the AF lens group 4 and the AF lens group frame 8, respectively, with a minimum distance therebetween (see FIG. 8).

[Commencement of Off-Axis Displacement of the Third Lens Group]

FIGS. 9A(3) and 9B(3) show a state where the third lens group 3 (the third lens group frame 7) has commenced to rotate toward the radially retracted position (off-axis displaced position). A rotation of the helicoid ring 15 in the lens barrel retracting direction causes the third lens group frame 7 to move linearly rearward with the third lens group moving ring 9, which causes the distance control bar 7a to come into contact with the approaching-position limiting surface 8a of the AF lens group frame 8, and a further rotation of the helicoid ring 15 causes the AF lens group frame 8 to move rearward with the third lens group frame 7. On the other hand, the aforementioned rearward linear movement of the third lens group frame 7 with the third lens group moving ring 9 causes the displacing operation control bar 7b to come into contact with the displacing cam surface 21b of the displacing cam bar 21a, and a further rotation of the helicoid ring 15 causes the third lens group frame 7 to commence rotating toward the radially retracted position (off-axis displaced position).

[Commencement of Movement of Displacing Operation Control Bar Onto Displacing Cam Surface (Inclined Surface)]

FIGS. 9A(4) and 9B(4) show a state where the third lens group frame 7 is in the process of rotating to the radially retracted position (off-axis displaced position) by a sliding movement of the displacing operation control bar 7b of the third lens group frame 7 on the displacing cam surface 21b of the displacing cam bar 21a. Once the third lens group frame 7 commences to rotate, the distance control bar 7a slides on the approaching-position limiting surface 8a of the AF lens group frame 8 and reaches the boundary between the approaching-position limiting surface 8a and the distance-extending cam surface 8b (see FIG. 11A).

[Completion of Movement of Displacing Operation Control Bar onto Displacing Cam Surface (Inclined Surface)]

FIGS. 10A(1) and 10B(1) show a state where the third lens group frame 7 has further rotated toward the off-axis displaced position while moving rearward and consequently the distance control bar 7a has just moved onto the distance-extending cam surface 8b (see FIG. 11B).

When the distance control bar 7a slides on the distance-extending cam surface 8b, the AF lens group frame 8 is pressed in a direction away from the third lens group frame 7 to move rearward against the biasing force of the fourth-lens-group biasing spring 25. Subsequently, the distance control bar 7a reaches the distance holding surface 8c that is continuous with the distance-extending cam surface 8b. Although the distance-extending cam surface 8b is formed as an inclined flat surface which extends obliquely with respect to a the photographing optical axis Z1 direction along the rotating path of the distance control bar 7a, such an inclined surface can be replaced by a curved surface or any other shaped surface as long as it is shaped to have the function of extending the distance between the third lens group frame 7 and the AF lens group frame 8.

In addition, if the surface of the distance control bar 7a which comes in contact with the distance-extending cam surface 8b is a curved surface or an inclined surface, the distance-extending cam surface 8b can be a surface extending in the optical axis direction.

While the control bar 7a and the distance holding surface 8c remain in contact with each other, the third lens group frame 7 (and the third lens group 3) and the AF lens group frame 8 (and the AF lens group 4) are held with a predetermined clearance therebetween so as not to interfere (come into contact) with each other even if the third lens group frame 7 rotates.

[Completion of Off-Axis Displacement of Third Lens Group]

FIGS. 10A(2) and 10B(2) show a state where the third lens group 3 has rotated to the off-axis displaced position by a further rearward movement of the third lens group moving ring 9. Upon the third lens group frame 7 (the third lens group 3) rotating to the radially retracted position (off-axis displaced position) due to cam action of the displacing cam surface 21b of the displacing cam bar 21a with the displacing operation control bar 7b, the distance control bar 7a of the third lens group frame 7 is disengaged from the distance holding surface 8c. Thereupon, the AF lens group frame 8 moves forward by the biasing force of the fourth-lens-group biasing spring 25 to a position where the AF lens group frame 8 comes into contact with the AF nut 23 or the first linear guide ring 14. On the other hand, the displacing operation control bar 7b is disengaged from the displacing cam surface 21b. In this state, the third lens group frame 7 (the third lens group 3) has moved to the radially retracted position (off-axis displaced position) that is eccentrically positioned away from the photographing optical system, and the third lens group 3 and the AF lens group 4 are positioned away from each other in a direction orthogonal to the photographing optical axis Z1. Thereafter, the third lens group frame 7 (and the third lens group 3) and the AF lens group frame 8 (and the AF lens group 4) are moved rearward to the respective retracted positions (fully-retracted positions) thereof with the third lens group moving ring 9.

[Retracted State (Fully-Retracted State)]

FIGS. 10A(3) and 10B(3) show the zoom lens 30 in the retracted state (fully-retracted state), in which the helicoid ring 15 has rotated to the retraction position. A further rotation of the helicoid ring 15 toward the retraction position from the radially-retracting operation completion state shown in FIGS. 10A(2) and 10B(2) causes the third lens group moving ring 9 to move linearly rearwards, and causes the third lens group frame 7 and the AF lens group frame 8 to integrally move linearly rearwards. The third lens group frame 7 has been moved rearward with the displacing operation control bar 7b sliding on the displacing cam bar 21a in a state of being prevented from rotating toward the photographing position by the biasing force of the torsion spring 29. The AF lens group frame 8 is in contact with the first linear guide ring 14 and has been moved rearward against the biasing force of the torsion spring 25 and held in the retracted position (see FIGS. 10A(3) and 10B(3)).

According to the above-described lens frame radially-displacing mechanism of the present invention, in a state immediately before the zoom lens 30 is fully retracted, the third lens group 3 and the AF lens group 4 are positioned close to each other with a minimum distance therebetween and are prevented from further approaching each other, which makes it possible to make the third lens group 3 and the AF lens group 4 closely approach each other to the limit (closest positions). Moreover, when the zoom lens 30 is fully retracted, the third lens group 3 and the AF lens group 4 commence to retract (move rearward) in the optical axis direction from the respective closest positions thereof to each other. However, since the AF lens group 4 (and the AF lens group frame 8) is configured so as to move away from the third lens group 3 (and the third lens group frame 7) via the distance control bar 7a, the distance-extending cam surface 8b and the distance holding surface 8c, before the third lens group 3 is made to move rearward, there is no possibility of the third lens group 3 (and the third lens group frame 7) interfering with the AF lens group 4 (and the AF lens group frame 8) even if the third lens group 3 (and the third lens group frame 7) moves in a direction orthogonal to the photographing optical axis Z1 in order to radially displace the third lens group 3 (and the third lens group frame 7).

In the retracting operation of the zoom lens 30, the AF lens group 4 is fully retracted to the fully-retracted position shown in FIG. 10A(3) by a rearward movement of the AF nut 23 by driving the AF motor 26 in the lens barrel retracting direction during the retracting operation of the zoom lens 30.

When the zoom lens 30 moves from the fully-retracted state (shown in FIGS. 1 and 10A(3)) to a ready-to-photograph state in which the zoom lens 30 is at the wide-angle extremity state shown in FIGS. 9A(1) and 9B(1)), firstly the helicoid ring 15 is rotated in the lens barrel advancing direction, and during this process the third lens group frame 7 together with the third lens group 3 moves forward with a side surface of the support plate 21 (specifically a side edge of the displacing cam bar 21a) preventing the displacing operation control bar 7b from rotating (see FIGS. 10A(2) and 10B(2)). Subsequently, upon the displacing operation control bar 7b reaching the displacing cam surface 21b of the displacing cam bar 21a, the displacing operation control bar 7b slides on the displacing cam surface 21b by the biasing force of the torsion spring 29, which causes the third lens group frame 7 to rotate while moving forward (see FIGS. 10A(1), 10B(1), 9A(4) and 9B(4)), and consequently, the third lens group 3 reaches a position on the photographing optical axis Z1 (see 9A(3) and 9B(3)). Thereafter, the third lens group frame 7 moves forward, without rotating, to a position where the third lens group 3 and the AF lens group 4 are positioned close to each other with a minimum distance therebetween (see FIGS. 9A(2) and 9B(2)).

Subsequently, the helicoid ring 15 further advances while rotating to the wide-angle extremity position, the third lens group frame 7 further advances, and the distance control bar 7a is held at the wide-angle extremity position at a predetermined distance from the approaching-position limiting surface 8a (see FIGS. 9A(1) and 9B(1)).

On the other hand, upon completion of the advancing operation of the helicoid ring 15 to the wide-angle extremity position, the AF motor 26 is actuated to move the AF nut 23 forward to its initial position. This forward movement of the AF nut 23 causes the AF lens group 4 and the AF lens group frame 8 to follow the forward movement of the AF nut 23 due to the biasing force of the torsion spring 29, thus moving forward to their initial positions. When the AF lens group 4 and the AF lens group frame 8 are positioned at the initial positions thereof, the distance control bar 7a and the approaching-position limiting surface 8a are away from each other.

Although the radially-displaceable optical element and the rear optical element are the third lens group 3 and the AF lens group 4, respectively, in the above described embodiment of the zoom lens 30, the radially-displaceable optical element and the rear optical element in the present invention are not limited solely to these particular optical elements provided in the above illustrated embodiment.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A lens frame radially-displacing mechanism of a retractable photographic lens, comprising:
    a plurality of optical elements which constitute a photographing optical system;
    a linearly advancing/retreating ring which is guided linearly in an optical axis direction of said photographing optical system and retreats in a direction toward an imaging plane when said retractable photographic lens moves from a ready-to-photograph state to a retracted state;
    a radially-displaceable support frame which is pivoted about a pivot extending parallel to said optical axis, supports a radially-displaceable optical element included in said plurality of optical elements, and rotates about said pivot between an on-axis position, at which said radially-displaceable optical element is positioned on said optical axis, and an off-axis displaced position, at which said radially-displaceable optical element is eccentrically positioned with respect to said optical axis, when said retractable photographic lens moves between said ready-to-photograph state and said retracted state, respectively;
    a rear support frame which supports a rear optical element positioned behind said radially-displaceable optical element when said retractable photographic lens is in said ready-to-photograph state; and
    a distance controller which controls approaching positions of said displaceable support frame and said rear support frame,
    wherein said distance controller comprises:
    an approaching-position limiter which limits relative movements of said displaceable support frame and said rear support frame to a predetermined distance between said approaching positions of said displaceable support frame and said rear support frame when said displaceable support frame moves rearward, and a distance extender which extends said predetermined distance between said approaching positions of said displaceable support frame and said rear support frame to an extended distance when said displaceable support frame rotates toward said off-axis displaced position.

2. The lens frame radially-displacing mechanism according to claim 1, wherein said approaching-movement limiter comprises:
    a displaceable support-frame distance control member provided on said displaceable support frame; and
    a rear support-frame distance limiter provided on said rear support frame, said displaceable support-frame distance control member coming in contact with said rear support-frame distance limiter when said displaceable support frame and said rear support frame closely approach each other,
    wherein said distance extender is formed as a rear support frame distance extending portion which is continuous with said rear support-frame distance limiter and with which said displaceable support-frame distance control member comes in sliding contact.

3. The lens frame radially-displacing mechanism according to claim 2, wherein said rear support frame further comprises a rear support-frame distance holder which is continuous with said rear support frame distance extending portion,
    wherein said rear support-frame distance holder continues to hold said displaceable support frame and said rear support frame at said extended distance until said displaceable support frame reaches a radially-displaced position at which said displaceable support frame and said displaceable optical element do not interfere with said rear support frame and said rear optical element, and
    wherein, upon said displaceable support frame reaching said radially-displaced position, said displaceable support-frame distance control member is disengaged from said rear support-frame distance limiter.

4. The lens frame radially-displacing mechanism according to claim 3, wherein said displaceable support frame comprises a displacing operation control portion which comes in contact with a displacing portion provided on a stationary part of said retractable photographic lens to control a rotation of said displaceable support frame toward said off-axis displaced position so that said displaceable support-frame distance control member rotates in a direction to slide on said rear support-frame distance limiter, said rear support frame distance extending portion and said rear support-frame distance holder in that order when said linearly advancing/retreating ring retreats in said direction toward said imaging plane.

5. The lens frame radially-displacing mechanism according to claim 1, wherein said rear support frame is supported to be freely movable in said optical axis direction with movement of said rear support frame toward an object side being limited,
    wherein said rear support frame is biased toward said object side by a spring, and
    wherein said rear support frame is moved away from said displaceable support frame against a biasing force of said spring when said displaceable support-frame distance control member slidingly contacts said rear support frame distance extending portion.

6. The lens frame radially-displacing mechanism according to claim 1, wherein said radially-displaceable optical element and said rear optical element are positioned away from each other in a direction orthogonal to said optical axis when said retractable photographic lens is in said retracted state.

7. The lens frame radially-displacing mechanism according to claim 1, wherein said distance extender comprises an inclined surface which extends obliquely upwardly rearwardly with respect to a plane orthogonal to said optical axis.

8. The lens frame radially-displacing mechanism according to claim 1, wherein said rear support frame is guided linearly in said optical axis direction without rotating.

9. The lens frame radially displacing mechanism according to claim 1, said distance extender comprising an approaching position limiting surface and a distance holding surface provided at different distances along the optical axis direction, a distance extending cam surface transitioning between the approaching position limiting surface and the distance holding surface.

10. The lens frame radially displacing mechanism according to claim 9, said distance extender being configured such that once said displaceable support frame starts moving to the off axis displaced position, a distance control bar, provided on said displaceable suppor frame, slides along the approaching position limiting surface and reaches a transition boundary between said approaching position limiting surface and said distance extending cam surface.

11. The lens frame radially displacing mechanism according to claim 10, wherein, when said distance control bar slides along said distance extending cam surface, said rear support frame is biased to move in a direction away from said radially displaceable support frame.

12. The lens frame radially displacing mechanism according to claim 11, wherein, upon completion of movement of the radially displaceable support frame to the off axis displaced position, said distance control bar comes out of contact with said distance extender.

13. The lens frame radially displacing mechanism according to claim 1, said distance extender contacting a distance control bar, provided on said displaceable support frame, when said displaceable support frame is in the on-axis position.

* * * * *